United States Patent [19]

Blose et al.

[11] Patent Number: 4,662,659
[45] Date of Patent: May 5, 1987

[54] TUBULAR JOINT WITH TRAPPED MID-JOINT METAL-TO-METAL SEAL HAVING UNEQUAL TAPERS

[75] Inventors: Thomas L. Blose, Houston; K. Darrel Chelette, Katy; Donald J. Ortloff; Doyle E. Reeves, both of Houston, all of Tex.

[73] Assignee: Hydril Company, Los Angeles, Calif.

[21] Appl. No.: 856,426

[22] Filed: Apr. 21, 1986

Related U.S. Application Data

[63] Continuation of Ser. No. 458,734, Jan. 17, 1983, abandoned.

[51] Int. Cl.⁴ .............................................. F16L 25/00
[52] U.S. Cl. .................................... 285/334; 285/355
[58] Field of Search ................. 285/333, 334, 92, 355, 285/390

[56] References Cited

U.S. PATENT DOCUMENTS

| | | |
|---|---|---|
| 1,927,656 | 9/1933 | Eaton et al. |
| 2,211,179 | 8/1940 | Stune. |
| 2,992,019 | 7/1961 | MacArthur ..................... 285/334 X |
| 3,224,799 | 12/1965 | Blose et al. ..................... 285/334 X |
| 3,324,799 | 12/1965 | Blose et al. ......................... 285/334 |
| 3,489,437 | 1/1970 | Duret ............................. 285/334 X |
| 3,702,702 | 11/1972 | Rosan .................................... 285/92 |
| 3,989,284 | 11/1976 | Blose .............................. 285/334 X |
| 4,009,893 | 3/1977 | Schatton et al. ............... 285/334 X |
| 4,161,332 | 7/1979 | Blose .................................. 285/334 |
| 4,192,533 | 3/1980 | Blose .................................. 285/334 |
| 4,244,607 | 1/1981 | Blose .............................. 285/334 X |

Primary Examiner—Dave W. Arola
Attorney, Agent, or Firm—Dodge, Bush & Moseley

[57] ABSTRACT

A joint and male and female tubular elements are disclosed where the threads of the female and male members have negative load flanks and have two or more radial steps axially separated one from another by a reverse angle torque shoulder having one or two adjacent conical sealing surfaces. The reverse angle torque shoulder serves as a positive assembly stop. The negative load flank angle of the threads and the reverse torque shoulder angle combine to interlock the male and female members and to prevent differential radial separation of the conical sealing surfaces when the joint is exposed to internal pressure, external pressure or both. Tapered threads and sealing surfaces and interference threads may advantageously be used in joint construction.

Tapered conical sealing surfaces where the taper of the member having the thinner wall thickness at the seal surface is inclined at a smaller angle with respect to the axis of the threaded connection than the complementary conical seal surface of the mating member, may advantageously be used so that the bearing load across the entire axial width of the male and female sealing surfaces has a relatively even distribution at final make-up.

7 Claims, 8 Drawing Figures

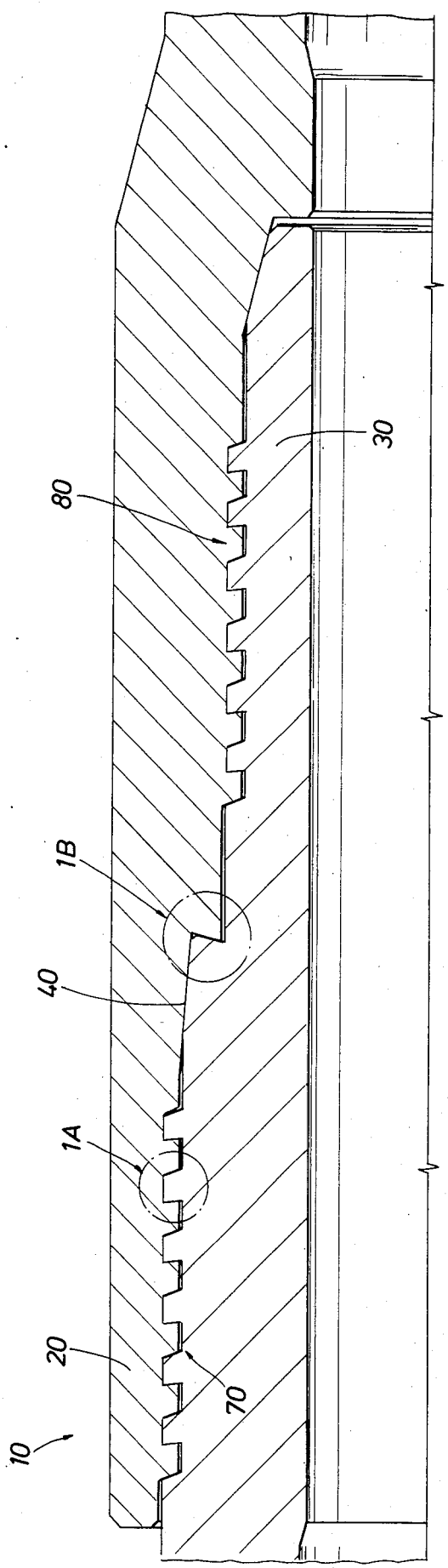
FIG.1
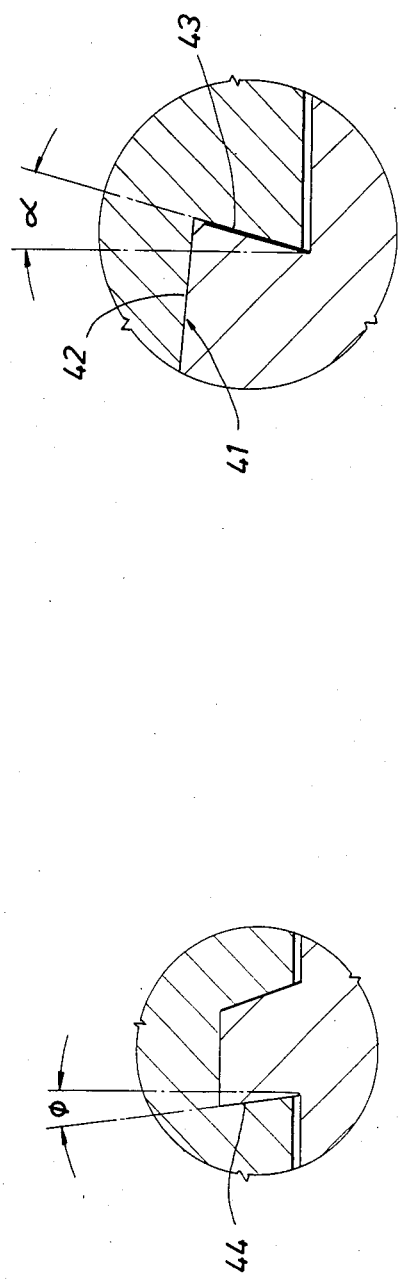
FIG.1B
FIG.1A

TUBULAR JOINT WITH TRAPPED MID-JOINT METAL-TO-METAL SEAL HAVING UNEQUAL TAPERS

This application is a continuation of application Ser. No. 458,734, filed Jan. 17, 1983, now abandoned.

BACKGROUND OF THE INVENTION

1. Field of the Invention

This invention relates generally to oil and gas well tubing and more particularly has to do with the construction of high pressure tubular joints operable when made-up and run into a well to withstand extreme fluid pressures, both internal and external, that seek escape through the tubular assembly at the joints.

2. Description of the Prior Art

The search for oil and gas reserves has brought about the exploration of ever deeper formations. These deeper formations require longer strings of the production pipe, casing, liners and drill pipe used in the exploration and production of oil and gas at extremely high pressures. This increased length of tubular strings imposes the upper portion of the string to very high tensile loads and in addition, the tubular strings are exposed to extremes of pressure both from within the tubing and also from the exterior of the tubing.

Prior art metal-to-metal sealing mechanisms have provided seals that resist mainly internal pressure or mainly external pressure, as long as the surrounding tubular geometry remains in the elastic range. The prior art sealing mechanisms have not solved the sealing problem of withstanding extremes of internal pressure, or external pressure, either pressure acting during circumstances of high tension, torque or compression forces acting on the tubing.

U.S. Pat. No. 2,992,019 to M. D. MacArthur shows a casing joint having metal-to-metal sealing means responsive primarily to extremes of inside fluid pressure. The disclosed interior sealing for the pin and box provides a fourteen degree (14°) interior seal that is spaced a distance from the threaded inner connection to enable the deformation or strain on the pin, in response to the inside fluid pressure, to flex the pin interior sealing surface against the box interior sealing surface and obtain a greater sealing force. In addition, during such strain, the sealing contact area decreases which increases the sealing force over the reduced area. In particular, the distance between the pin and the seal surface remains the same while the center of the sealing area moves slightly toward the thread during such sealing flexing.

U.S. Pat. No. 4,009,893 issued to Schatton, et al. discloses a tubing or casing joint with box and pin members having two axially spaced thread sections separated by a radial step zone which includes for the pin member, an annulus having an axial undercut. The endface of the annulus bears against a complementary face in the step zone of the box member and serves to act as a complementary thread stopface, in addition to a stopface at the end of the pin member and in the box member.

There has been a long-felt need for metal-to-metal sealing mechanisms for use in tubular joints which are able to hold mating members together for complete leak resistance against both internal and external pressures, regardless of the force of tension, compression, internal pressure, external pressure, torque or any combination thereof that are applied to the joint.

It is therefore a primary object of this invention to provide a trapping mechanism in a joint to hold the mating members together for complete leak resistance in the face of multiple forces acting on the joint.

Not only must the joint be sealed, it must be capable of being made up and disassembled numerous times without galling and without the danger of stripping threads or cross-threading. It is of course, desirable and therefore an advantage of the joint according to the invention disclosed herein in that it may be "stabbed" and that thereafter it can be made up with a relatively small number of turns.

It is common to use an integral or upset joint wherein the threaded portion of the pipe is thickened by a forging technique so as to provide more metal in the area where threads are cut. The invention disclosed below may advantageously be used with an integral or upset type of joint, and it may also be used with a threaded and coupled joint wherein both ends of the tubular elements are provided with male joining elements and a coupling member is provided with female joining elements.

SUMMARY OF THE INVENTION

The objects and advantages of the invention result from providing two or more axially spaced thread sections which are separated by a radial step zone, providing negative load flank threads in combination with a reverse angle torque shoulder at the intermediate region between the steps and placing a low angle conical seal on either or both steps adjacent to the shoulder separating two steps to provide one or more seals for containment of both internal and external pressures. The pressure containment characteristic of the joint can be achieved with very little interference between mating seal members by virtue of the trapping effect of the negative load flank thread on one side and the reverse angle shoulder on the other side of the seal surface. The reverse angle torque shoulder serves as the positive assembly stop shoulder. In addition, the reverse angle torque shoulder in conjunction with the negative load flank thread maintains radial positional interference of the conical sealing surfaces when the male and female members of the joint are fully assembled. The negative load flank angle of the threads and the reverse torque shoulder angle are selected to interlock the male and female members and to prevent differential radial separation of the conical sealing surfaces when the joint is exposed to internal pressure, external pressure, axial tension, compression or torque. Tapered threads and sealing surfaces and interference threads may also be advantageously used in the joint construction.

Tapered conical sealing surfaces (where the taper of the conical seal surface of the member having the thinner wall thickness at the seal surface is machined to a smaller angle with respect to the axis of the threaded connection than the complementary conical seal surface of the mating member) may advantageously be used so that the bearing load across the entire axial width of the male and female sealing surfaces has a relatively even distribution at final make-up.

BRIEF DESCRIPTION OF THE DRAWINGS

The object, features and advantages of the invention will be better understood from the following description taken in connection with the accompanying drawings in which:

FIG. 1 illustrates a longitudinal cross-sectional section through a joint according to the invention showing in detail in FIGS. 1A and 1B, the negative flank angle and the reverse torque shoulder features of the invention;

FIG. 4A shows conical sealing surfaces on both sides of the reverse angle torque shoulder and FIG. 4B illustrates the use of a reverse angle torque shoulder between two or more stepped threads.

DESCRIPTION OF THE INVENTION

Figure 3:
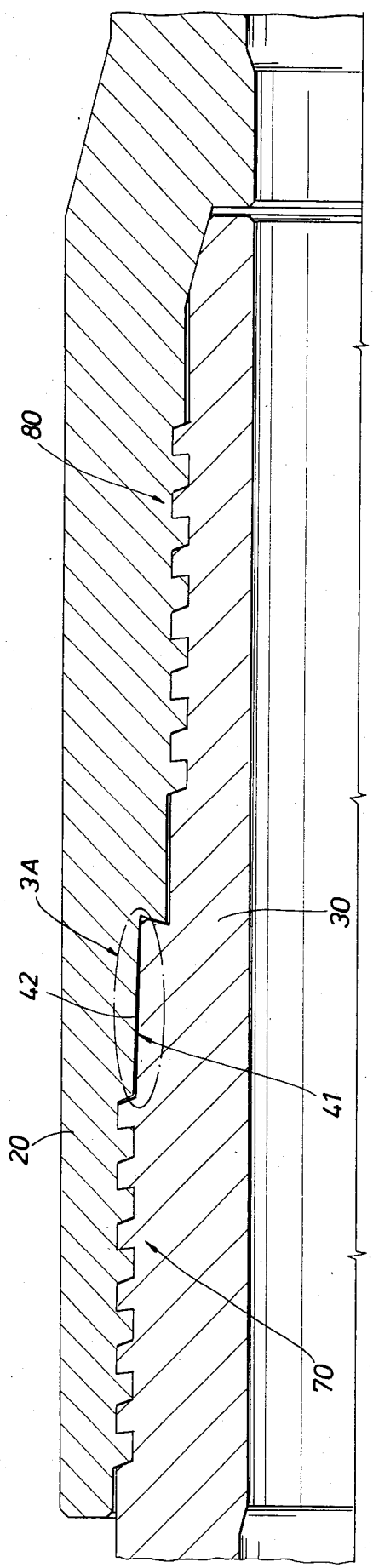
FIG. 3 and FIG. 3A shows and embodiment of the invention where the conical sealing surfaces of the male and female members are machined at slightly different angles.

FIG. 1 illustrates, according to the invention, a joint shown generally at 10 comprising female or box member 20 in threaded connection with pin or male member 30 and having two step threads shown generally at 70 and 80 interconnected by conical sealing surface 40. The joint is characterized, according to the invention, by providing a negative load flank angle on the threads shown generally in more detail in FIG. 1A and a reverse torque angle shoulder shown in more detail in FIG. 1B.

FIG. 1A illustrates that the load flank 44 on the threads is at an angle $\phi$ which is measured counterclockwise from the vertical to the longitudinal plane of the threads.

FIG. 1B illustrates that the sealing surfaces 41 and 42 of the pin and box members terminate in a shoulder 43 which is at a reverse angle $\alpha$ measured clockwise from the perpendicular to the longitudinal axis of the joint.

The sealing surface contact of surfaces 41 and 42 is established at assembly to metal-to-metal interference. Upon full make up to the joint, the mating of the respective torque angle shoulders may induce additional radial positional interference into the contacting sealing surfaces 41 and 42, especially for steep shoulder angles. Thus, two sources of radial positional interference are possible in the joint of the assembled members according to the invention: interference caused by the assembly of the sealing surfaces 41 and 42 and, for reverse torque angle shoulder provided with steep angles, interference caused by the mating of the respective shoulders.

The seal pressure retention characteristic of the threaded connection is related to the ability of the sealing surfaces 41 and 42 to remain in contact with one another as radial deflection of the joint occurs from either internal pressure or external pressure. The unique seal retention according to the invention results from the trapping effect of the negative load flank threads of both the large step threads 70 and the small step threads 80 in combination with the reverse angle shoulder 43 in the intermediate region between the steps thereby preventing loss of surface contact between surfaces 41 and 42. The trapping effect causes the two surfaces 41 and 42 to deflect as one.

The seal is established regardless of differences in the annular section areas of each member 41 and 42 thus providing a pressure containment wherein forces act from either side of the seal. In addition, the application of an axial tensile load will cause the seal surface to remain in contact. Similarly, torque forces on the joint do not adversely affect the seal of the joint. Advantageously, the only way that the sealing surfaces can separate is for extreme forces acting on the joint to cause the threads to shear, the shoulder to shear, or both.

Figure 2:
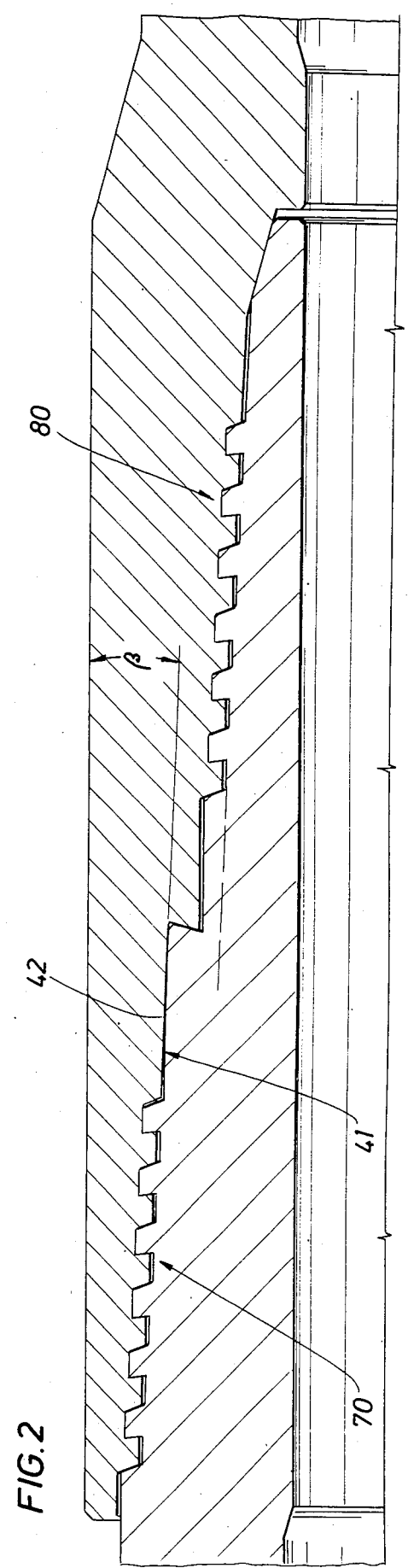
FIG. 2 illustrates an alternative embodiment of the invention with a longitudinal cross-section showing threads cut on a taper angle with respect to the axis of the male and female members of the joint.

Although FIG. 1 shows the threads 70 and 80 to be cut parallel to the axis of the box member 20 and pin member 30, an alternative embodiment is shown in FIG. 2 where threads 70 and 80 are cut on a taper angle shown generally as $\beta$. Although FIG. 2 illustrates the sealing surfaces 41 and 42 to be cut at the same taper angle $\beta$ as are the threads 70 and 80, they may advantageously be provided at a taper angle different from the thread taper.

Figure 3A:
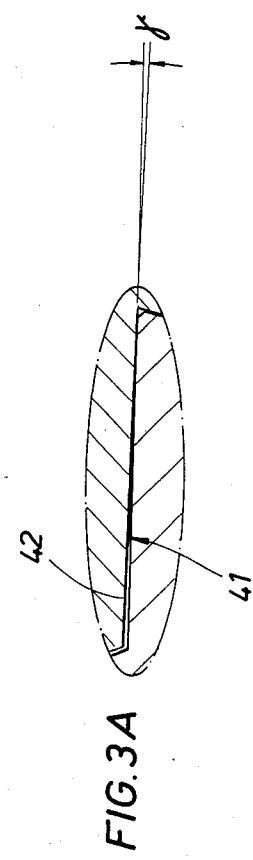

FIG. 3 shows another alternative embodiment of the invention whereby the conical sealing surfaces 41 and 42 of the top step are machined to slightly different angles with respect to the axis of the joint. According to the invention, the conical seal surface of the member having the thinner wall thickness of the seal surface is machined to a smaller angle with respect to the axis of the threaded connection than the complementary conical seal surface of the mating member. Individual sealing shoulder members are shown in more detail in FIG. 3A. Because of the conical seal at the upper step illustrated in FIGS. 3A occurs at a region where the female member 20 wall thickness is less than the wall thickness of the male member, the sealing surface 42 of the female member is machined to an angle of incline which is slightly less than the angle of incline of sealing surface 41. FIG. 3A indicates the angle difference to be $\gamma$. The mismatch of the angles of inclines of conical sealing surfaces 42 and 41 is selected for any particular seal geometry such that at final make-up, the bearing load has a relatively even distribution across the entire sealing surface in contact, thus broadly distributing make-up stresses and minimizing their negative effects.

Referring to FIG. 3A where for the upper step having the female conical sealing surface 42 machined at an angle slightly less than that of male surface 41, when the pin member 30 initially mates with box member 20, the bearing load is substantially on the leading edge of the box sealing surface 42 with the trailing edge of the pin sealing surface 41. After the sealing surfaces are fully made-up, the stress as a function of axial width becomes more uniform than for the case where the taper angles of the sealing surfaces are the same or where the taper angle of the box sealing surface is greater than the taper angle of the pin sealing surface.

Metal-to-metal seal taper angles commonly are provided in a range of from two degrees (2°) to fourteen degrees (14°). The exact angular taper mismatch of the sealing angles of surfaces 41 and 42 varies depending on the seal angle of the more rigid member, the width of the sealing surface, the thickness of the thinner member, desired tolerances and other factors. It can be shown that seal mismatch for very low angle seals of approximately one-half ($\frac{1}{2}''$) inch in axial width can be as low as one-quarter degree ($\frac{1}{4}°$). High angle seals of equal axial width may require a mismatch of one degree (1°) or more for complete balancing of bearing loads upon full make-up. Finite element analysis may be used as a tool to verify the optimum seal angle mismatch on any given seal and connection geometry.

FIG. 3 also shows that threads 70 and 80 may be interference fitting threads.

Figure 4A:
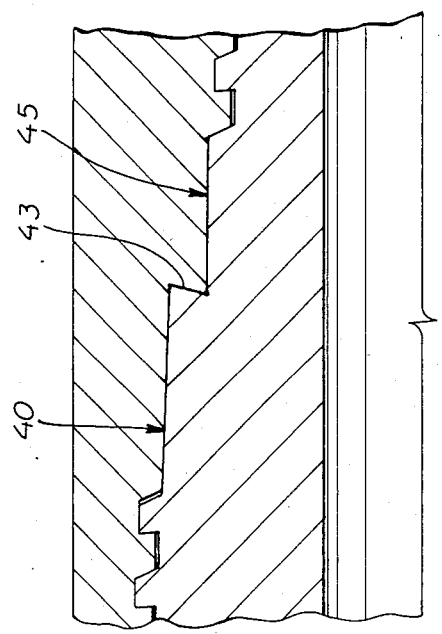
FIGS. 4A and 4B illustrates alternative embodiments of the invention where
Figure 4B:
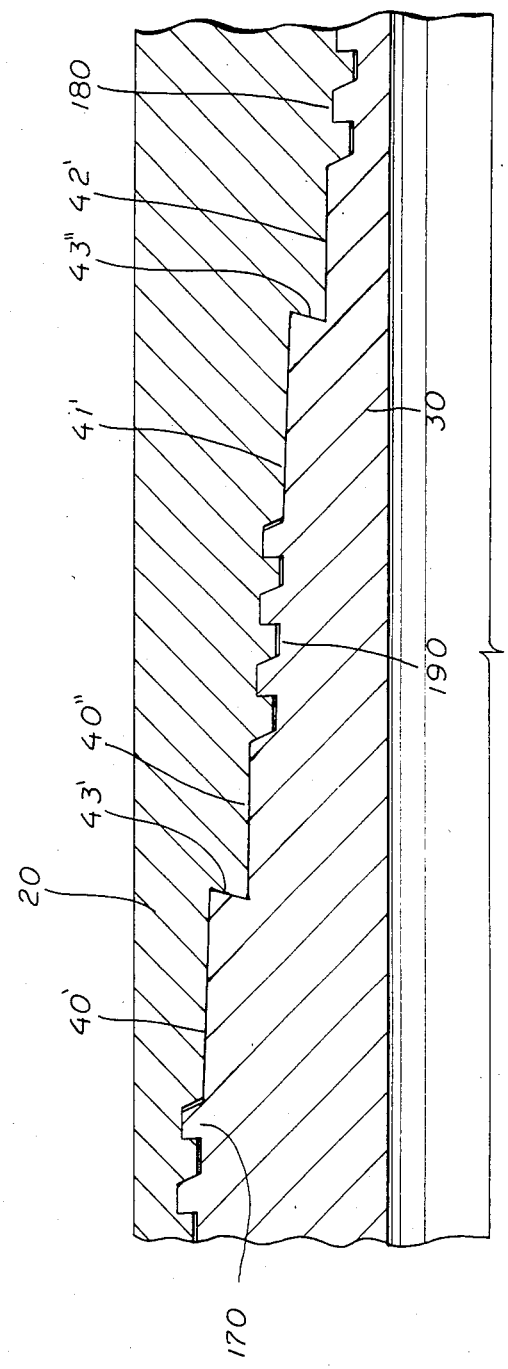

FIGS. 4A and 4B illustrate alternative embodiments of the invention. FIG. 4A illustrates the reverse torque angle shoulder 43 between the two step threads and having not only conical sealing surface 40 (as illustrated in FIG. 1) on the large step, but also conical sealing surface 45 on the small step. Alternatively a conical sealing surface 45 could be provided solely on the small step with no sealing surface being provided on the large step. Thus, one conical sealing surface provided on either step adjacent the reverse angle torque shoulder, or two sealing surfaces, one provided on each of the steps, serve in conjunction with the reverse angle torque shoulder and the negative load flank threads to create the unique trapping effect of the invention.

Where as illustrated in FIG. 4A, a conical sealing surface is provided as at 45 on the small step and the female member 20 wall thickness is greater than the thickness of the male member, the sealing surface of the female member is machined to an angle of incline which is slightly greater than the angle of incline of the sealing surface of the male member.

FIG. 4B illustrates that the combination of negative load flank threads and reverse torque angle shoulder between stepped threads may be used for tubular connections or joints having two or more stepped threads. For example, triple radial step threads 170, 190, and 180 may advantageously be used for thick walled tubulars. According to the invention, reverse angle torque shoulders 43' and 43" are provided between thread steps 170 and 190 and between thread steps 190 and 180. Providing one conical sealing surface such as 40' or 40" on each axial side of shoulder 43' and one conical sealing surface such as 41' or 42' or both 41' and 42' on each axial side of shoulder 43" serves to achieve the trapping effect discussed above when used in combination with negative load flank threads. At least one of the shoulders between each step serves as a positive assembly step. More stepped threads with intermediate reverse angle torque shoulders and associated conical sealing surfaces could advantageously find applications for tubulars having extremely thick walls.

In all the embodiments of this invention the magnitude of the negative thread flank angle or the angle of the reverse angle shoulder should not exceed thirty degrees (30°). In addition, it has been found that the magnitude of the angle of the conical sealing surfaces relative to the joint axis should not be greater than fifteen degrees (15°). Finally, for that embodiment of the invention illustrated in FIG. 3, the dissimilarity of the angles of incline of the sealing surfaces of the male and female members should be less than one degree where the angle of incline of the member having the greater wall thickness should be greater than that of the member having the lesser wall thickness.

From the foregoing, it is apparent that there has been provided a sealing surface for use in joints, and interconnecting tubular members especially useful in oil and gas wells. Various modifications and alterations in the described structures will be apparent to those skilled in the art from the foregoing description which do not depart from the spirit of the invention. For this reason, these changes are desired to be included in the scope of the appended claims. The appended claims recite the only limitations of the present invention and the descriptive matter which is employed for setting forth the present embodiment and is to be interpreted as illustrative and not limitative.

What is claimed is:

1. A joint for tubular elements comprising,
an internally threaded female member and an externally threaded male member adapted to be threadably connected,
the threads of the female and male members having negative angle load flanks and at least two radial steps axially separated from one another by a reverse angle torque should having at least one adjacent conical sealing surface where the taper angle of the conical sealing surface of the member having the thinner wall thickness of the seal surface is inclined at a smaller angle with respect to the axis of the threaded connection than the complementary conical seal surface of the mating member, said female member torque shoulder and said male member torque shoulder being in direct engagement upon make-up of the joint, said male member conical sealing surface adjacent said reverse angle torque shoulder being formed on a substantially solid, pipe wall uninterrupted from the interior of the male member to the sealing surface
whereby, said shoulders serve as a positive axial and radial assembly stop and said conical sealing surfaces develop radial positional interference when the male and female members are fully assembled, and the negative load flank angle of the threads and the reverse torque shoulders combine to interlock the male and female members and to prevent differential radial separation of the conical sealing surfaces when the joint is exposed to internal pressure, external pressure or both.

2. The joint of claim 1 wherein said radial positional interference is the result of the assembly of the sealing surfaces during joint make up and by the mating of the respective reverse angle torque shoulders.

3. A joint for tubular elements comprising,
an internally threaded female member and an external threaded male member adapted to be threadably connected,
the threads of the female and male members having negative angle load flanks and having two radial steps axially separated from one another by a reverse angle torque shoulder having an adjacent conical seal between the upper step and the reverse angle torque shoulder where the conical sealing surface of the female member is tapered with respect to the female member axis at a first angle, and the conical sealing surface of the male member is tapered with respect to the axis of the male member at an angle greater than the taper angle of the female member, said female member torque shoulder and said male member torque shoulder being in direct engagement upon make-up of the joint, said shoulders serving as a positive axial and radial assembly stop, said male member conical sealing surface adjacent said reverse angle torque shoulder being formed on a substantially solid, pipe wall uninterrupted from the interior of the male member to the sealing surface,
whereby on initial mating of said male conical sealing surface with the female conical sealing surface, the bearing load is substantially on the leading edge of the female sealing surface with the trailing edge of the male sealing surface, and wherein the angle difference between the male sealing surface and the female sealing surface is selected such that the bearing load across the entire axial width of the seal of mating female conical sealing surface and male conical sealing surface is relatively even distribution at final make-up.

4. A joint for tubular elements comprising, an internally threaded female member and an externally threaded male member adapted to be threadably connected, the threads of the female and male members having negative angle load flanks and having radial steps axially separated from one another by a reverse angle torque shoulder having an adjacent conical seal between the lower step and the reverse angle torque shoulder where the wall thickness of the female member at the conical sealing surface is greater than the wall thickness of the male member at its conical sealing surface and where the conical sealing surface of the female is tapered with respect to the female member axis at a first angle, and the conical sealing surface of the male member is tapered with respect to the axis of the male member at an angle less than the taper angle of the female member, said female member torque shoulder and said male member torque shoulder being in direct engagement upon make-up, said shoulders serve as a positive axial and radial assembly stop, said male member conical sealing surface adjacent said reverse angle torque shoulder being formed on a substantially solid, pipe wall uninterrupted from the interior of the male member to the sealing surface, whereby on initial mating of the male conical sealing surface with the female conical sealing surface, the bearing load is substantially on the leading edge of said male sealing surface with the trailing edge of the female sealing surface, and wherein the angle difference between the male sealing surface and the female sealing surface is selected such that the bearing load across the entire axial width of the seal of mating female conical sealing surface and male conical sealing surface is a relatively even distribution at final make-up.

5. A joint for tubular elements comprising, an internally threaded female member and an externally threaded male member adapted to be threadably connected, the threads of the female and male members having negative angle load flanks and having two radial steps axially separated from one another by a reverse angle torque shoulder having a first adjacent conical seal between the upper step and the reverse angle torque shoulder where the first conical sealing surface of the female member is tapered with respect to the female member axis at an angle, and the first conical sealing surface of the male member is tapered with respect to the axis of the male member at an angle greater than the taper angle of the female member, and a second adjacent conical seal between the lower step and the reverse angle torque shoulder where the second conical sealing surface of the female member is tapered with respect to the female axis at an angle and the second conical sealing surface of the male member is tapered with respect to the axis of the male member at an angle less than the taper angle of the female member, said female member torque shoulder and said male member torque shoulder being in direct engagement upon make-up of the joint, said shoulders serving as a positive axial and radial assembly stop, whereby, on initial mating of said first male conical sealing surface with the first female conical sealing surface, the bearing load is substantially on the leading edge of the first female sealing surface with the trailing edge of the first male sealing surface, wherein the angle difference between the first male sealing surface and the first female sealing surface is selected such that the bearing load across the entire axial width of the seal of mating first female conical sealing surface and first male conical sealing surface is a relatively even distribution at final make-up, whereby on initial mating of the second male conical sealing surface with the second female conical sealing surface, the bearing load is substantially on the leading edge of the second male sealing surface with the trailing edge of the second female sealig surface, and wherein the angle diference between the second sealing surface and the second female sealing surface is selected such that the bearing load across the entire axial width of the seal of mating second femle conical sealing surface and second male conical sealing surface is a relatively even distribution at final make-up.

6. A male tubular member adapted for use for coaxial threaded interconnection with a female tubular member, the female tubular member having internal threads with negative angle load flanks and at least two radial steps axially separated from one another by a reverse angle torque shoulder having at least one adjacent conical sealing surface, said male member comprising, external threads with negative angle load flanks and at least two radial steps axially separated from one another by a reverse angle torque shoulder with at least one adjacent conical sealing surface where the member having the thinner wall thickness at the sealing surface is inclined at a smaller taper angle with respect to the axis of the threaded connection than the corresponding conical sealing surface of the mating member, said male member conical sealing surface adjacent said reverse angle torque shoulder being formed on a substantially solid, pipe wall uninterrupted from the interior of the male member to the sealing surface, whereby said male torque shoulder when mated with said female torque shoulder produces an axial and radial positive assembly stop, said female member torque shoulder and said male member torque shoulder being in direct engagement upon make-up of the joint.

said male conical sealing surface when mated with said female conical sealing surface develops radial positional interference when the male and female members are assembled, and whereby the male negative load flank angle and the male torque shoulder angle are selected to mate with the female negative load flank angle and the female torque shoulder angle to interlock the male and female members and to prevent differential radial separation of the conical sealing surfaces when the mated threads are exposed to internal pressure, external pressure or both and, whereby on initial mating of each male conical sealing surface with the corresponding female conical sealing surface, the bearing load is substantially on the leading edge of the sealing surface of the member having the thinner wall thickness with the trailing edge of the sealing surface of the member having the thicker wall thickness, and wherein the angle difference between said male sealing surface and said female sealing surface is selected such that the bearing load across the entire axial width of the seal of mating female conical sealing surface and male conical sealing surface has a relatively even distribution at final make-up.

7. A female tubular member adapted for use for coaxial threaded interconnection with a male tubular member, the male tubular member having external threads with negative angle load flanks and at least two radial steps axially separated by a reverse angle torque shoulder having at least one adjacent conical sealing surface, said male member conical sealing surface adjacent said reverse angle torque shoulder being formed on a substantially solid, pipe wall uninterrupted from the interior of the male member to the sealing surface, said female member comprising, internal threads with negative angle load flanks and at least two radial steps axially separated from one another by a reverse angle torque shoulder with at least one adjacent conical sealing surface where the member having the thinner wall thickness at the sealing surface is inclined at a smaller taper angle with respect to the axis of the threaded connection than the corresponding conical sealing surface of the mating member, whereby said female torque shoulder when mated with said male torque shoulder produces an axial and radial positive assembly stop, said female member torque shoulder and said male member torque shoulder being in direct engagement upon make-up of the joint, said female conical sealing surface when mated with said male conical sealing surface develops radial positional interference when the male and female members are assembled, and whereby the female negative load flank angle and the female torque shoulder angle are selected to mate with the male negative load flank angle and the male torque shoulder angle to interlock the female and male members and to prevent differential radial separation of the conical sealing surfaces when the mated threads are exposed to internal pressure, external pressure or both, and whereby on initial mating of each female conical sealing surface with the male conical sealing surface, the bearing load is substantially on the leading edge of the sealing surface of the member having the thinner wall thickness with the trailing edge of the sealing surface of the member having the thicker wall thickness, and wherein the angle difference between said female sealing surface and said male sealing surface is selected such that the bearing load across the entire axial width of the seal of mating female conical sealing surface and the male conical sealing surface has a relatively even distribution at final make-up.

* * * * *